United States Patent [19]
Dillon

[11] Patent Number: 5,904,365
[45] Date of Patent: May 18, 1999

[54] COMBINE WITH POWERED AND STEERABLE GRAIN TRAILER

[76] Inventor: Ben N. Dillon, 206 Greensprings Dr., Columbus, Ohio 43235

[21] Appl. No.: 08/927,872

[22] Filed: Sep. 11, 1997

[51] Int. Cl.⁶ .................................................. B62D 12/00
[52] U.S. Cl. ........................ 280/419; 280/426; 180/14.1; 180/14.2; 460/23
[58] Field of Search .................................. 280/419, 426, 280/442, 443; 180/14.1, 14.2, 253, 308; 56/16.6, 473.3; 460/23, 119

[56] References Cited

U.S. PATENT DOCUMENTS

| | | | |
|---|---|---|---|
| 3,225,852 | 12/1965 | Simmons et al. | 180/14.1 |
| 4,031,976 | 6/1977 | Lambert | 180/14.1 |
| 4,350,190 | 9/1982 | McColl | 180/14.1 |
| 5,167,581 | 12/1992 | Haag | 56/16.6 |
| 5,579,228 | 11/1996 | Kimbrough et al. | 280/426 |
| 5,630,604 | 5/1997 | Ducote | 280/426 |

*Primary Examiner*—J J Swann
*Assistant Examiner*—Lynda Jasmin
*Attorney, Agent, or Firm*—Mueller and Smith, LPA

[57] ABSTRACT

A powered towing vehicle having steering wheels and a wheeled trailer is connected to the vehicle for its towing. The wheels of the trailer are connected to a source of power for generating forward and rearward movement of the trailer. These wheels also are connected to a source of power for turning such wheels in order to steer the trailer. These wheels further are connected to a sensor to sense the position of the trailer wheels as they are being steered. The steering wheels of the towing vehicle also are connected to a sensor to sense the position of the vehicle wheels as they are being steered. The trailer steering wheel sensor is displayed to an operator of the vehicle so that the vehicle operator knows the relative position of each of the steering wheels. The trailer steering power source is connected to the vehicle so that an operator of the vehicle can remotely steer the wheels of the trailer. Alternatively, the towing vehicle and the wheeled trailer can be integrally formed into an articulated vehicle having a forward bogie having at least one axle assembly which is steerable and powered, and a rearward concatenated bogie having one axle assembly which is powered and steerable.

24 Claims, 7 Drawing Sheets

COMBINE WITH POWERED AND STEERABLE GRAIN TRAILER

BACKGROUND OF THE INVENTION

The present invention generally relates to combines that pull a grain trailer for extra storage capacity, and more particularly to a grain trailer which is integrated with the combine wherein grain trailer is both powered and steerable.

Modern grain combines, such as those used to harvest corn, wheat, soy beans, etc., and corn pickers, have significantly increased their throughput capability. These increases have resulted from improvements such as wider cutting heads and increased number of row units per machine in the case of row crops such as corn. The threshing and grain separating capacity of the machines has increased in parallel by building larger machines with higher horsepower engines.

Concomitant therewith, the number of acres in the average North American farm has increased dramatically with crop fields becoming larger and longer. Fields with a row length of one-half mile have become quite common.

The result of these simultaneous trends is that the amount of harvested crop or clean grain produced in one round or two lengths of the field has increased dramatically. The harvested grain must be carried along by the harvesting system until the end of the field is reached where it is transferred into a bulk transportation vehicle such as a truck (tractor-trailer or semi) or wagon. Combines have an onboard grain hopper in which to store the harvested grain until the end of the field has been reached. Seed corn pickers typically pull a trailer or wagon, or a truck is driven along side them to receive the grain.

Due to increased combine throughput and long fields, virtually no combine commercially available today has sufficient capacity in its on-board hopper to store the corn harvested during one round of an 80 acre field or a field which is one-half mile in length with the crop yields typically found in the U.S. corn belt. The on-board primary storage hoppers are limited in capacity by the physical size of the machine and the total weight of the combine with a full hopper which can be carried on 2 axles or 2 tracks in some cases.

Farmers and farm equipment manufacturers have addressed this problem by developing intermediate transport grain carts or trailers which are pulled by a separate tractor and operator. The grain cart/tractor combination is stationed at the opposite end of the field from the road transport (bulk storage) vehicle or along the length of the field to receive the grain from the combine when its primary hopper is full and before the combine reaches the end of the field where the road transport vehicle is located. The traditional grain cart has self-unloading capability usually in the form of an auger, conveyor, or side hydraulic dump mechanism which receives power from the tractor. The grain cart/tractor combination typically carries the grain to the end of the field and loads it into the road transport vehicle, such as a semi-truck. Examples of such grain wagons can be found in U.S. Pats. Nos. 5,013,208 and 5,340,265, and 5,409,344.

Grain cart capacities typically vary from 400 bushels to 1000 bushels. Therefore, a loaded grain cart and pulling tractor may weigh as much as 90,000 pounds. Repeated trips across the field by this large vehicle combination can produce additional soil compaction, particularly in wet conditions, which reduces future crop yields. This method of intermediate storage and movement of grain with the field incrementally adds one operator and significant capital cost to the harvesting process.

In the field of trailers or wagons that are towed by a farm tractor or over-the-road tractor-trailers (so-called "semis"), U.S. Pat. No. 2,667,028 shows a towable combine with an attached grain cart. U.S. Pat. No. 4,460,193 shows a pull type swather assembly which can be crabbed. U.S. Pat. No. 4,359,854 shows a tractor drawn combine which also can be crabbed. U.S. Pat. No. 5,412,929 shows the ability to steer a pair of rakes being towed by a tractor. U.S. Pat. No. 5,579,228 shows a servo steering control system for a non-powered trailer that includes forward and backward motion. U.S. Pat. No. 5,209,320 shows an articulated crop pesticide sprayer adapted to be pulled. U.S. Pat. No. 4,740,006 proposes to retrofit existing tractor trailers with a remote-control steering system. Finally, U.S. Pat. No. 5,329,451 proposes a steerable trailer and steering apparatus which includes a servo control.

None of these art proposals would appear to aid the farmer in extending his time in harvesting fields with consequent cost reductions. It would be advantageous if the combine itself could pull the grain trailer, however, power requirements would make it difficult for the combine to pull a full grain trailer. Then, too, the grain chute on present-day harvesters are unable to unload their grain directly behind them which is where the grain trailer would be if it were pulled by the harvester. Thus, a problem exists in this art field.

BRIEF SUMMARY OF THE INVENTION

The present invention is addressed to solving the problems detailed above by providing a grain trailer that can be pulled by a combine. In order to accomplish this task, the grain trailer is both steerable by the combine operator and is powered. Now, the grain trailer can be "crabbed" (laterally displaced from the combine) for the combine to unload its grain into the grain trailer. Also, the grain trailer can be crabbed for unloading both it and the combine grain storage bin simultaneously into a grain truck. Moreover, since the grain trailer can be steered remotely by the combine operator, only one person is required to operate such assembly. In a larger sense, however, the powered and steerable grain trailer can be used in other applications apart from farming and find wide use and acceptance. Thus, the present invention will be illustrated in detail with respect to use of the powered and steerable trailer as a grain trailer for towing by a combine; however, such description is by way of illustration and not a limitation of the present invention.

Broadly, the present invention is addressed to a combination of a powered towing vehicle having steering wheels and a wheeled trailer connected to the vehicle for its towing. The wheels of the trailer are connected to a source of power for generating forward and rearward movement of the trailer. These wheels also are connected to a source of power for turning such wheels in order to steer the trailer. These wheels further are connected to a sensor to sense the position of the trailer wheels as they are being steered. The steering wheels of said towing vehicle also are connected to a sensor to sense the position of the vehicle wheels as they are being steered. The trailer steering wheel sensor is displayed to an operator of the vehicle so that the relative position of each of the steering wheels is known to the vehicle operator. The trailer steering power source is connected to the vehicle so that an operator of the vehicle can remotely steer the wheels of the trailer. Alternatively, the towing vehicle and the wheeled trailer can be integrally formed into an articulated vehicle having a forward bogie having at least one axle assembly which is steerable and powered, and a rearward concatenated bogie having one axle assembly which is powered and steerable. The corresponding method for controlling the towed wheeled trailer forms another aspect of the present invention.

The drawings will be described in detail below.

DETAILED DESCRIPTION OF THE INVENTION

The present invention addresses all the problems associated with modern farming combines by integrating the grain cart function into the harvester system. The integrated system provides a second or auxiliary grain storage hopper without sacrificing harvester performance or flexibility. It increases the harvested grain carrying capacity from about 200–300 bushels to about 500–700 bushels utilizing both the primary and secondary hoppers. The secondary hopper is contained with a vehicle (trailer) attached directly to the combine which trailer has powered wheels that are steerable either in concert with the combine steering wheels or independent of the harvesting steering wheels to laterally displace the secondary hopper from the longitudinal center line of the harvester when the primary hopper of the combine is full. Alternatively, the trailer could be manufactured as an integral component of an articulated combine; although, the separate trailer permits retrofitting of the invention with existing combines. The grain is transferred into the secondary hopper while the combine machine remains traveling in the normal harvesting direction mode. The primary hopper then is refilled as the system continues its travel across the field. Utilizing both hoppers typically permits the harvesting system to complete a full round of a one-half mile long corn field with an 8-row corn head or multiple rounds of small grain crops, such as, for example, soybeans or wheat without stopping to transfer grain to a grain cart or to the road transport vehicle. When both the primary and the secondary hoppers in the system are full, the grain is transferred from both simultaneously into the road transport vehicle, grain cart, or other suitable storage facility.

The fact that the secondary hopper or integrated grain cart has powered wheels provides the ability to carry additional grain without adding unreasonable stress on the harvester structure and provides the capability to retrofit the system to existing harvesters. The powered wheels also facilitate turning the combination system when both hoppers are full.

The fact that the integrated grain trailer has wheels which may be steered in concert or coordinated with the harvester guiding wheels allows the entire system to have a minimum turning radius similar to the harvester alone. The steerable grain cart wheels also facilitate moving the integrated system either forward or backwards.

The fact that the integrated grain cart wheels may be independently steered remotely at the combine operator's discretion provides the ability to optimize the transfer of grain from the primary to the secondary hopper by positioning the center line of the secondary hopper under the discharge chute (auger) of the primary hopper when the auger is in the stowed or rearward projecting position. This is of particular importance in a retrofit system since it is not simple to change the stowed or rearward projecting position of the primary hopper discharge auger.

The ability to independently steer the integrated grain cart or laterally displace the centerline of the two hoppers greatly enhances the ability to unload the two hoppers simultaneously into the same road transport vehicle by providing the optimum stand-off distance for both hopper unloading mechanisms. Providing the operator with independent steering capability also greatly enhances the ability of the integrated vehicle system to maneuver around obstacles in tight quarters whether moving forward or backward.

Figure 1:
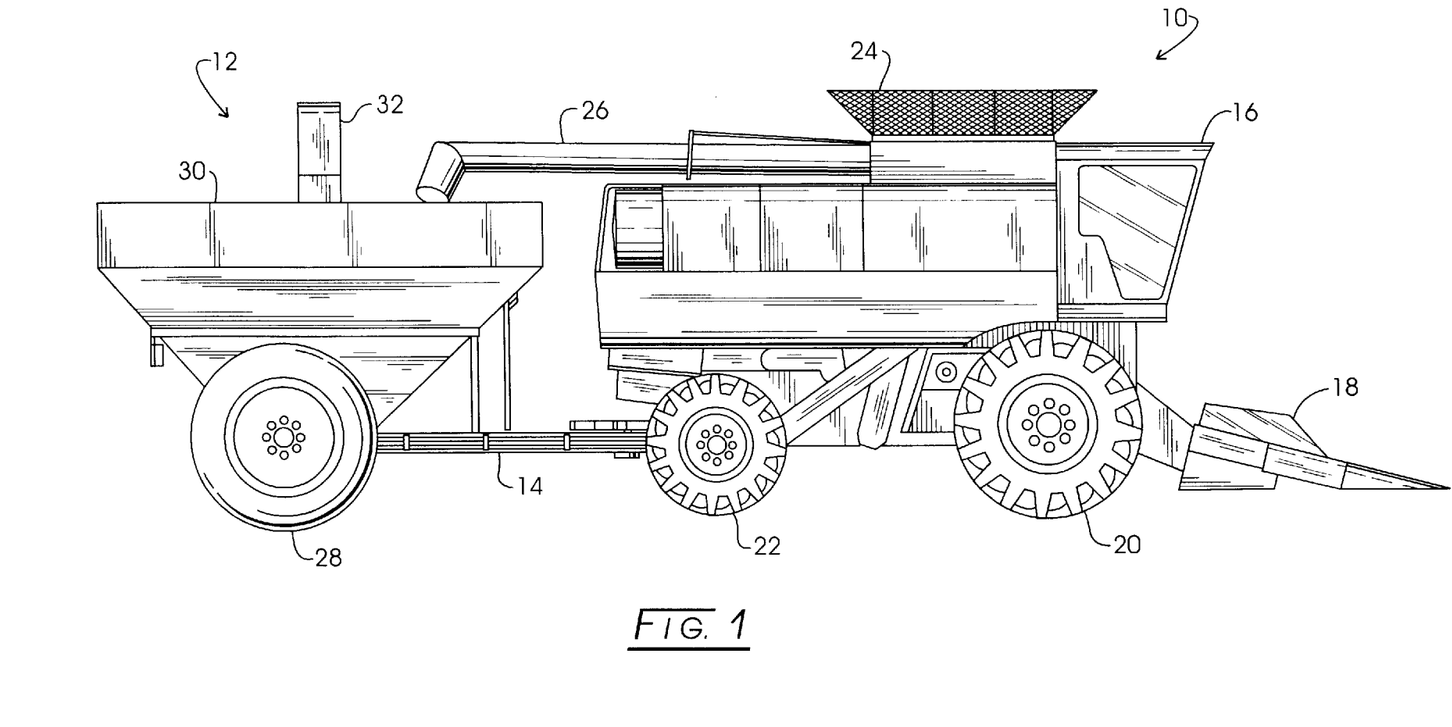
FIG. 1 is a side elevational view of the novel combination of combine (or harvester) and wheeled/steerable towed grain cart.

Referring initially to FIG. 1, the innovative integrated assembly is seen to generally include combine (or harvester) 10 and grain trailer (or cart) 12 which are mechanically interconnected by tongue assembly 14. Combine 10 generally includes cab 16 in which the operator is seated, cornhead 18, drive wheel pair 20 and steering wheel pair 22 (only one of each set of wheels being depicted in FIG. 1), primary grain hopper 24, and auger assembly 26 for unloading hopper 24. Such combine is a modem combine with all of the appurtenances and features that combine manufacturers provide today.

Similarly, grain cart 12 is convention in construction in that it includes wheel pair 28 (see FIG. 2 to view both wheel pairs 28a and 28b), secondary grain hopper 30, auger or conveyor discharge 32 for unloading hopper 30, and tongue 14. What cannot be seen in FIG. 1 is the lateral offset of auger assembly 26 from hopper 30. That is, were the combine operator to try to unload primary hopper 24 into secondary hopper 30 while auger assembly 26 is in its reward projected storage position, grain would be dumped to the side of hopper 30. This problem cannot be corrected unless the combine is altered to relocate the position of auger assembly 26 either in a retrofit mode for an existing combine or in the manufacture of a new combine specially designed to unload its primary hopper into the secondary hopper of grain cart 12. Then too, without some modification to combine 10, it would be difficult at best for combine 10 to move itself and grain cart 12 when both of the hoppers are full of grain, not to mention the difficulties in unloading both hoppers simultaneously since auger assemblies 26 and 32 are not of the appropriate length as manufactured to accommodate such simultaneous unloading of the hoppers. Further, steering around tight corners, backing up, etc., all are operations that would present a challenge even to the most experienced of combine operators.

Figure 2:
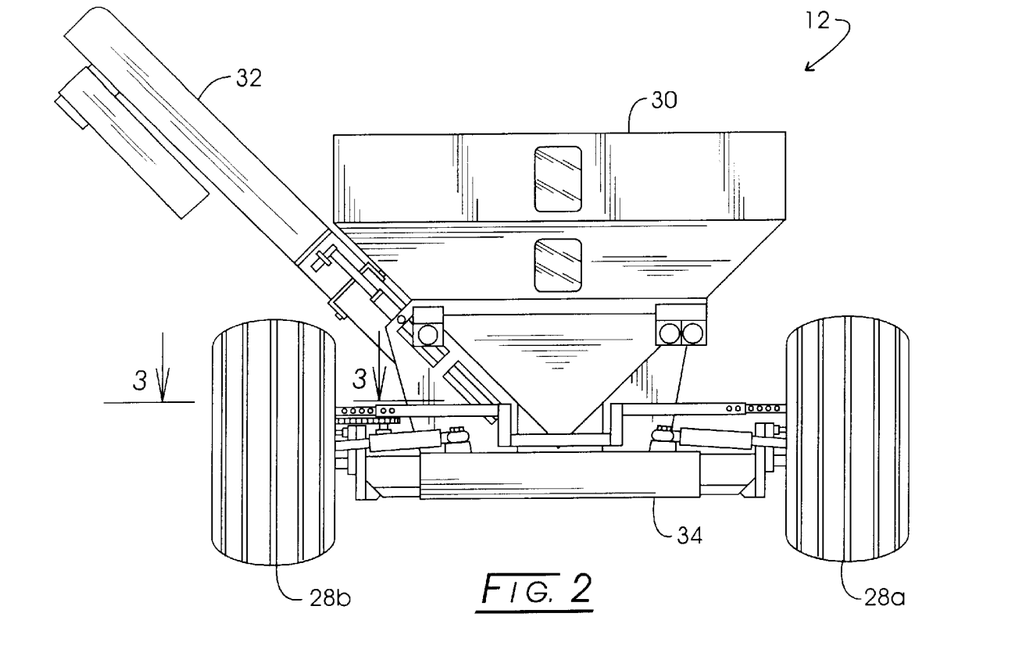
FIG. 2 is a rear elevational view of the grain trailer depicted in FIG. 1.
Figure 3:
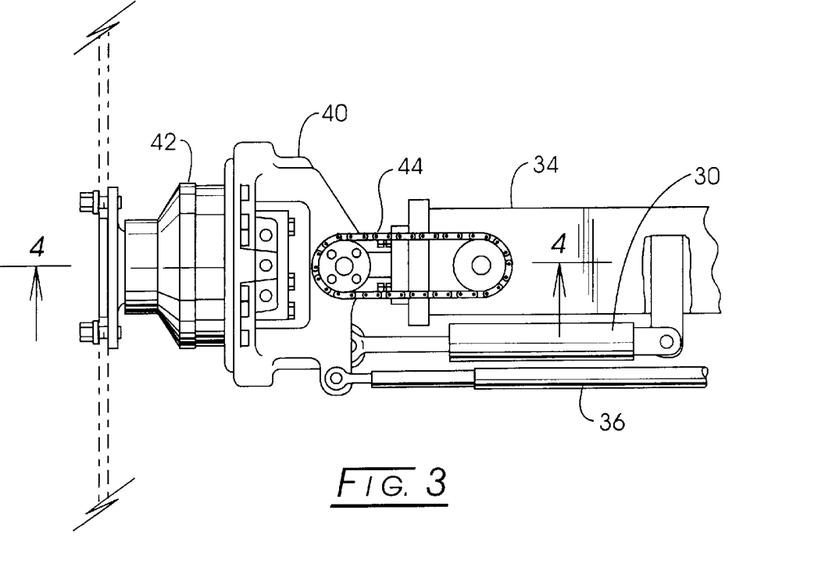
FIG. 3 is a sectional view taken along line 3—3 of FIG. 2.
Figure 4:
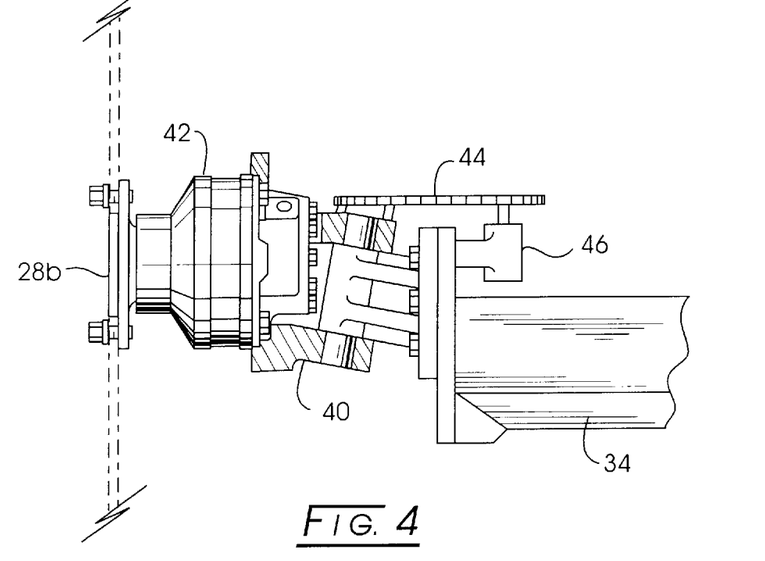
FIG. 4 is a sectional view taken along line 4—4 of FIG. 3.

Referring to FIGS. 2, 3, and 4, grain cart 12 is seen from its rear to include axle assembly 34 which has been modified at its interconnection with each of wheels 28a and 28b to provide drive to each wheel 28a and 28b and remote steering capability. Specifically describing the steering and drive mechanisms for wheel 28b with that for 28a being identical in construction, tie rod 36 ties the steering of wheels 28a and 28b together so that the wheels are synchronized. Hydraulic assembly 38 drives knuckle assembly 40 which in turn turns wheel assembly 28b. Wheel assembly 28a follows because of tie rod 36. Power is provided to wheel assembly 28a by hydraulic motor 42. The position of wheel assembly 28b is determined by chain 44 which is attached to a sprocket carried by steering knuckle assembly 40 at one end and to another sprocket carried by axle assembly 34 via a potentiometer or shaft encoder 46 (see FIG. 4). Of course, any suitable device designed to reflect the position of wheel assembly 28b (or 28a) is suitable for use. For example, the pivot point where tongue assembly 14 is connected to combine 10 could have an encoder that senses the angle of deflection of tongue assembly 14 from the longitudinal center of combine 10 which angle relates to the amount of turning of wheel pair 28 which degree of turning can be related to steering wheel pair 22 of combine 10. In the preferred embodiment depicted in the drawings, it should be mentioned that combine 10 has a sensor activated by its steering wheel pair 22 so that the operator can either coordinate the steering of combine 10 with grain cart 12 or steer them independent of one another.

Figure 5:
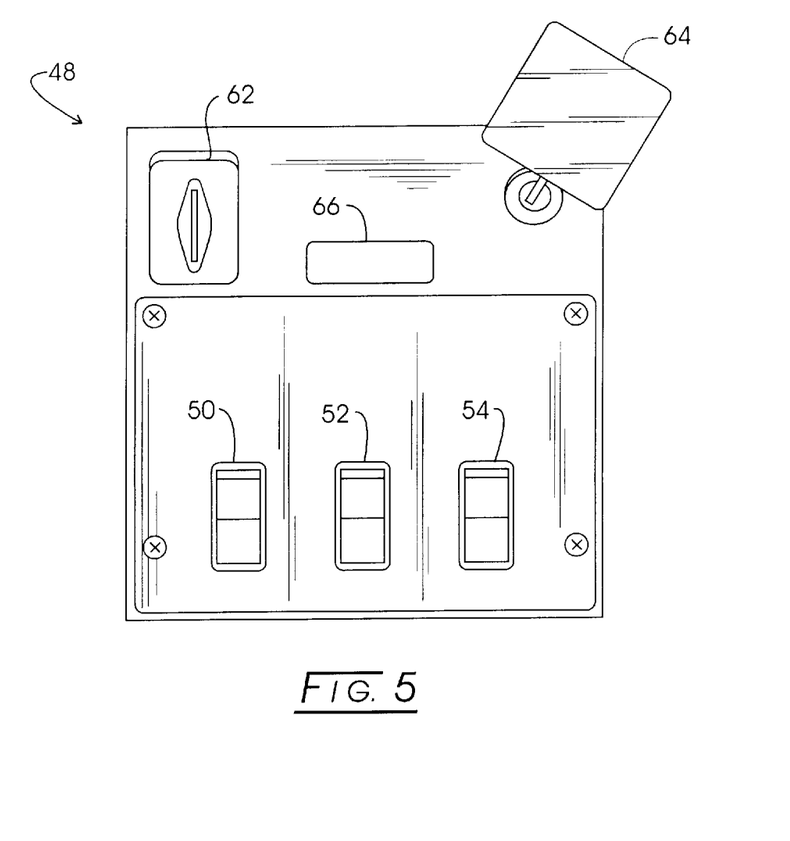
FIG. 5 is a plan view of the cart control panel in the harvester shown in FIG. 1.

Referring to FIG. 5, control panel 48 is located within cab 16 of combine 10 and is used by the combine operator to control the operation of both combine 10 and grain trailer 12. Specifically, control panel 48 is fitted with rocker switch 50 which is a 2-position switch to turn trailer hopper conveyor 32 on and off; rocker switch 52 which also is a 2-position switch for moving trailer hopper conveyor 32 up and down; and rocker switch 54 which is a 2-position momentary contact switch that opens and closes the gate on secondary hopper 30.

Switch 62 is a 3-position switch for the operator to determine whether grain cart 12 will be in an automatic steering mode (where cart 12 follows the exact path of combine 10), manual steering mode (where the operator steers cart 12 with rocker switch 66), or straight steering mode (where cart 12 acts like a conventional non-steerable trailer). Grain cart 12 can be manually steered by the combine operator via momentary contact rocker switch 66, as noted above. Wheel position indicator readout 64 (e.g., an LED array) tells the operator the position of wheels 28a and 28b of cart 12.

The ability to manually steer cart 12 enables the operator to control the position of cart 12 with respect to the longitudinal centerline of combine 10. As stated above, this enables the operator to off-load grain from primary hopper 24 into secondary hopper 30 while the combine is in the field harvesting the grain. Also, both hoppers can off-loaded into a road transport vehicle even though auger assemblies 26 and 32 are not equal in length. Moreover, the operator can maneuver more easily in the field and in tight places because grain trailer 12 is steerable.

Figure 6:
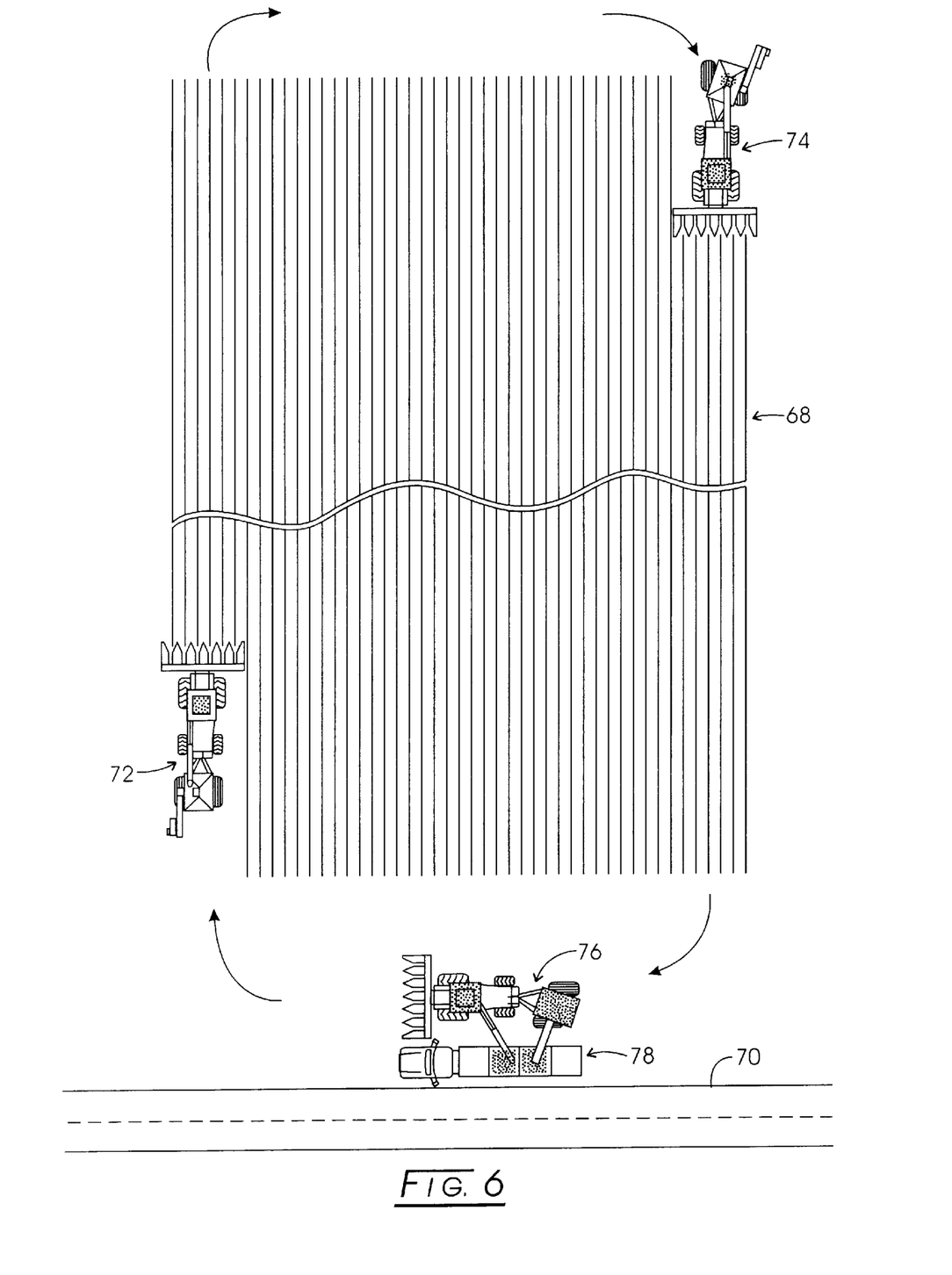
FIG. 6 is an overhead view of a field being harvested by the integrated assembly showing the trailer in different positions with respect to the combine.

FIG. 6 exemplifies such maneuvering capability of grain cart 12 by depicting field adjacent roadway 70 and the integrated combine/cart system in three different positions as it traverse field 68 during normal grain harvesting operations. Specifically, the integrated system at position 72 has combine 10 traveling in a straight line down one of the rows in field 68. Cart 12 is directly behind combine 10 as primary hopper 24 is being filled with clean grain. At position 74, cart 12 has been crabbed (laterally displaced from the longitudinal centerline of combine 10) so that secondary hopper 30 can be filled with grain from primary hopper 24 via auger assembly 26 which remains in its rearward safety stored position. Yet, combine 10 continues to travel down a row in field 68 still harvesting more grain. Finally, in position 76, both of the hoppers are full so that they need to be off-loaded into road vehicle 78. Again, the operator can maneuver grain cart 12 and combine 10 into suitable positions such that they both can simultaneously empty into carrier 78. Time, manpower, and capital investment have been saved by the unique ability of the integrated grain cart disclosed herein.

Figure 7:
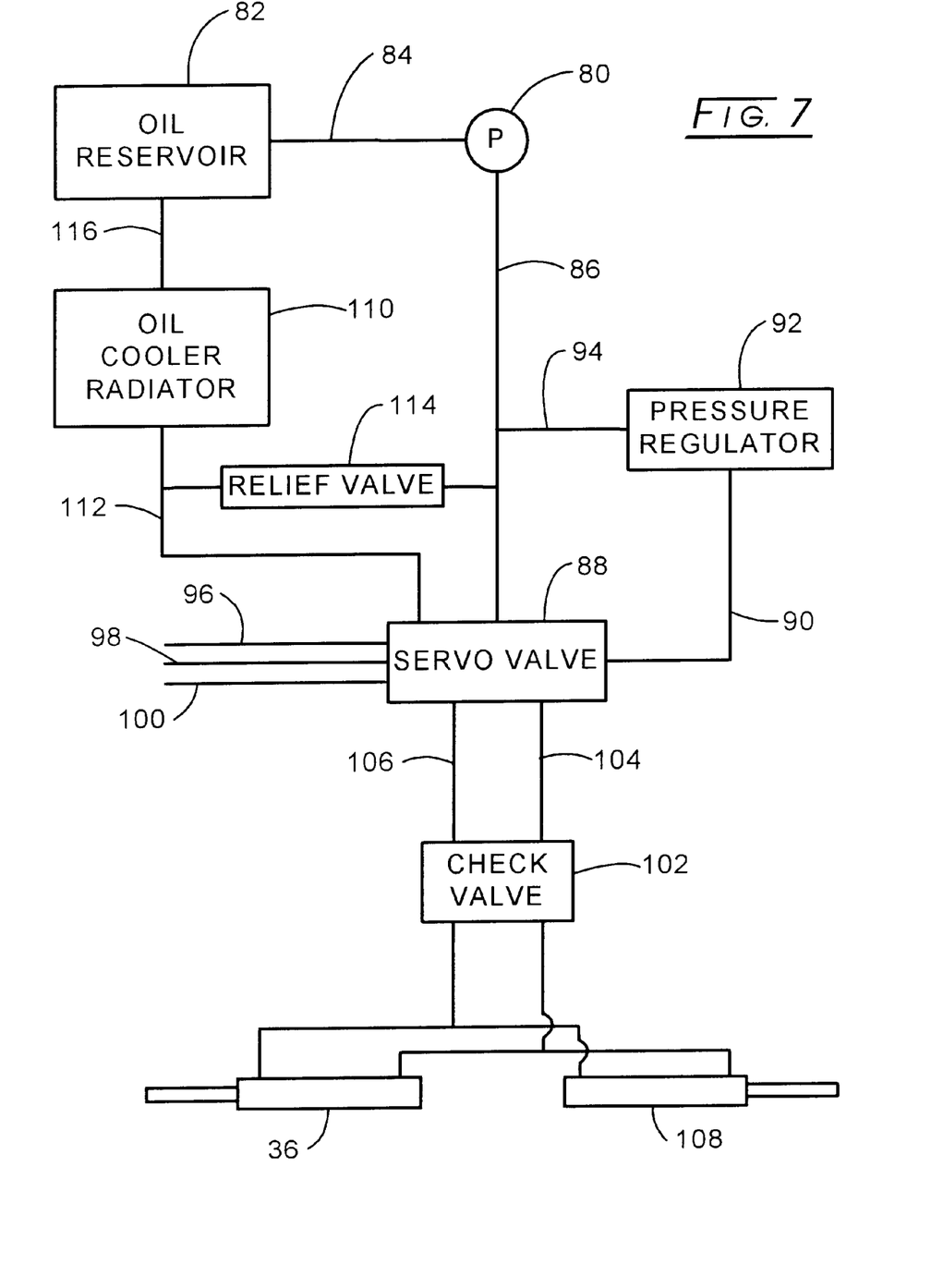
FIG. 7 is a schematic of the hydraulic steering system for the trailer.

FIG. 7 depicts the hydraulic steering system of the integrated assembly of the present invention. Specifically, pump 80 is a dedicated pump to steering and control of cart 12 and is driven by the engine of combine 10. A typical pump for this purpose would be an 18 gal/min at 2,000 psi rated pump. Pump 80 draws oil (hydraulic fluid) from oil reservoir 82 via suction line 84 and pumps oil at, say, 2,000 psi, in line 86 to servo valve 88 which is in communication via line 90 with pressure regulator 92 which thence is connected by line 94 to high pressure line 86. Pressure regulator 92 maintains 200 psi pilot pressure to servo the main control valve. Electrical lines 96, 98, and 100 are inputted to servo valve 88. These lines will described in connection with FIG. 9 below.

Oil from servo valve 88 runs through check valve 102 via line 104 with 106 being the return line. Check valve 102 holds wheel assembly 28 in position against turning forces when servo valve 88 is in a null position. Each wheel assembly 28a and 28b is connected to double acting steering cylinders 36 (see FIG. 3) and 108.

From servo valve 88, oil is returned to oil cooler radiator 110 via low pressure return line 112 which also is connected to pressure relief valve 114. From oil cooler radiator 110, the cooled oil is returned to oil reservoir 82 via line 116.

Figure 8:
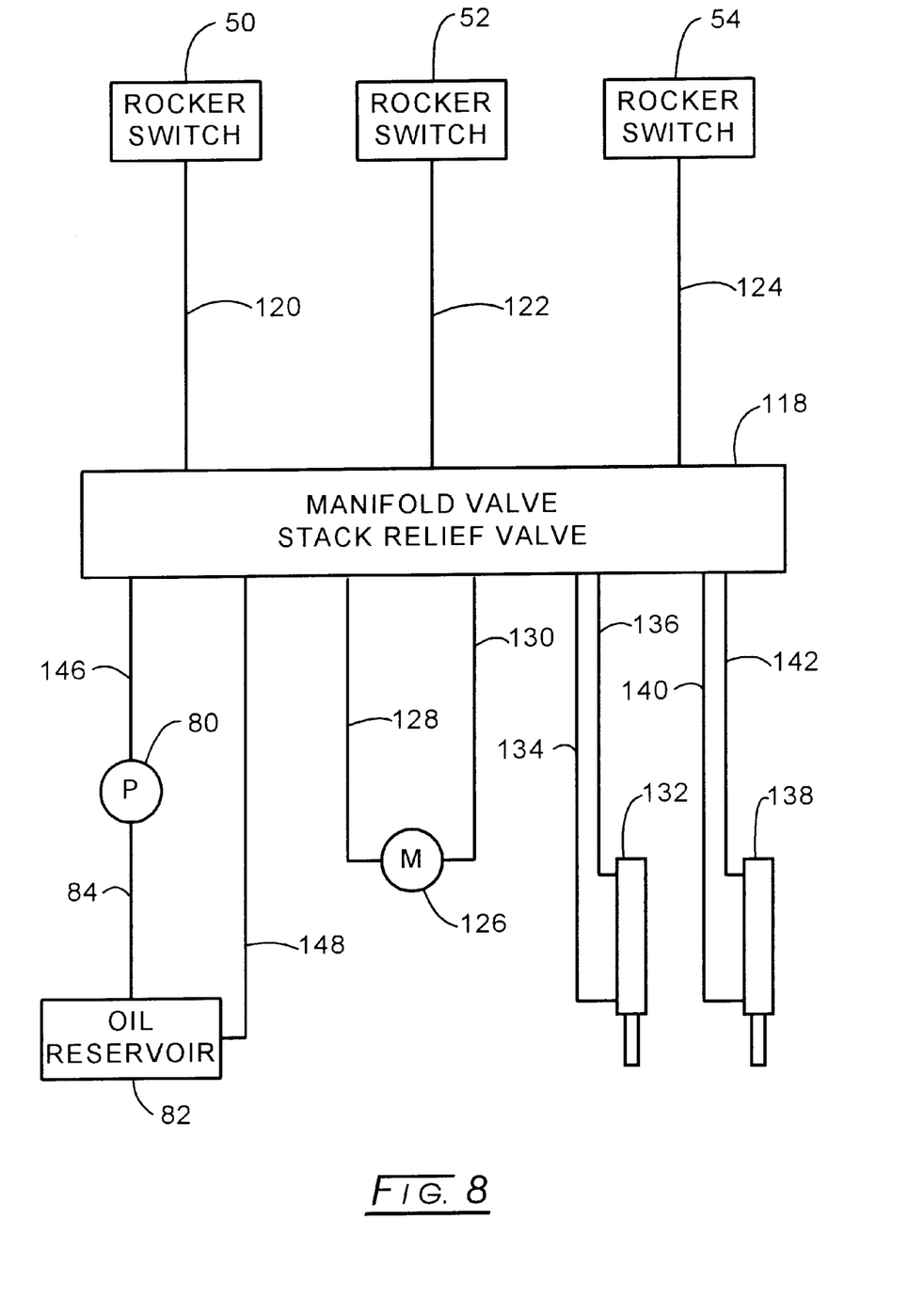
FIG. 8 is a schematic of the cart's hydraulic system.

FIG. 8 shows the combine hydraulic system wherein rocker switches 50, 52, and 54 provide electrical input to manifold/valve stack relief valve 118. Stack relief valve 118 is connected to pump 80 via high pressure line 146 and return line 148 which in turn conveys the oil to oil reservoir 82. Finally, suction line 84 conveys the oil back to pump 80. Pump 80 and reservoir 82 are common to the trailer hydraulic steering system and the cart's hydraulic system. Valve 118, then, in turn is connected to motor 126 via lines 128 and 130 which motor, operating at, say, 18 gal/min and 1,800 psi, drives the conveyor or assembly 32. Valve 118 also is connected to cylinder 132, via lines 134 and 136, which drives assembly 32 up and down. Valve 118 further is connected to cylinder 138, via lines 140 and 142, which opens and closes the gate on assembly 32.

Figure 9:
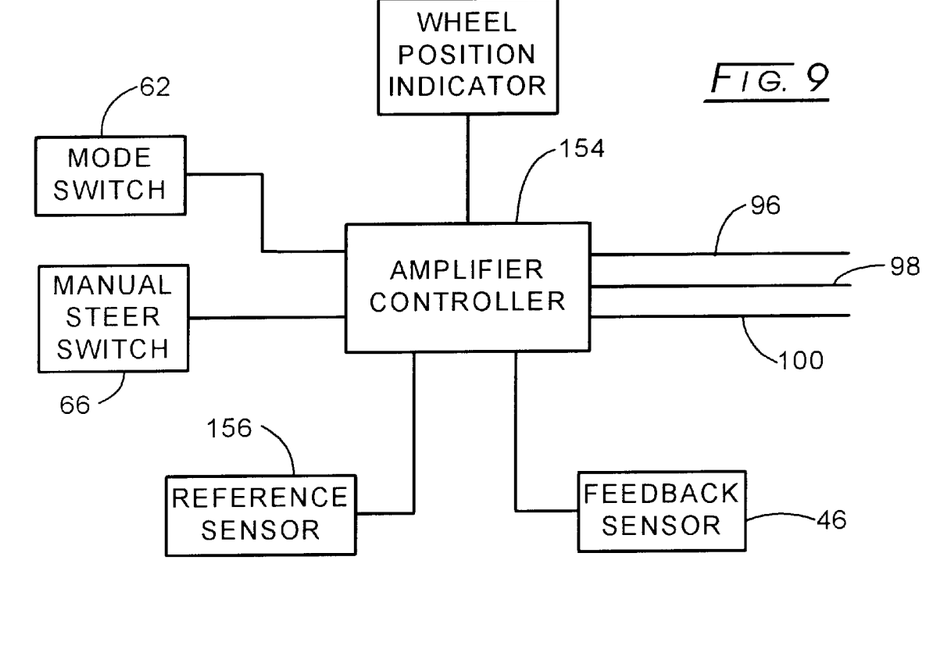
FIG. 9 is a schematic of the trailer's electrical system.

FIG. 9 depicts the electrical system steering of grain cart 12. Amplifier/controller 154 is connected to servo valve 88 via lines 96, 98, and 100 (see FIG. 7). Inputs to controller 154 include 3-position mode switch 62, manual steer switch 64, reference sensor 156 mounted on steering wheel pair 22 of combine 10, and feedback sensor 46 mounted on grain cart 12 (see FIG. 4).

Figure 10:
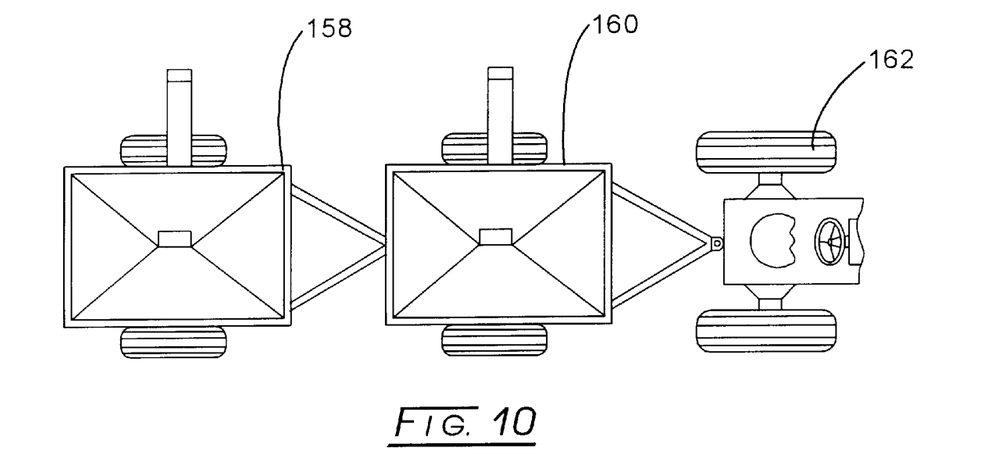
FIG. 10 is an overhead view of two of the novel trailers being towed by a tractor.

Finally, because grain cart 12 can be remotely and independently steered by the combine operator, multiple carts can be integrated with the towing vehicle. This is illustrated in FIG. 10 where cart 158 is towed by cart 160 which in turn is towed by tractor 162. Carts 158 and 160 may be grain carts or they can be carts with other functions ranging from simple hauling to processing of material. Tractor 162 can be a combine or it can be a traditional farm tractor, over-the-road tractor, other towing vehicle. The ability to independently steer both carts 158 and 160 enables multiple carts (2 shown in FIG. 10 for illustration purposes only as more than 2 carts can be towed as illustrated) to be towed by a single towing vehicle. Since each cart also is independently powered, the tractor's ability to pull loaded carts is not overly taxed.

It will be appreciated that the foregoing description is illustrative of how the present invention can be practiced, but it should not be construed as limiting the present invention. Changes can be made to the invention and still remain within the precepts of the present invention disclosed herein. For example, while a separate combine and trailer assembly have been shown and described herein, it is entirely conceivable that the trailer can be integrated into the combine to form an articulated combine wherein the front bogie would serve as the tractor while the rear bogie would serve as a super or giant grain trailer. By making the front bogie or tractor of the articulated combine steereable and the rear bogie or trailer of the articulated combine powered and steerable, the articulated combine would retain the advantages of the present invention disclosed herein. In this regard, the front bogie or tractor either could be single axle or double axle. In this configuration, the chaff distributor/fan mechanism, normally mounted on the combine, would be mounted on the rear bogie or trailer. Finally, all citations referred to herein are expressly incorporated herein by reference.

I claim:

1. In combination, a powered towing vehicle having steering wheels and a wheeled trailer connected to said vehicle for its towing,
    (A) the wheels of said trailer being:
        (a) connected to a source of power for generating forward and rearward movement of the trailer,
        (b) being connected to a source of power for turning such wheels in order to steer said trailer, and
        (c) being connected to a sensor to sense the position of the trailer wheels as they are being steered;
    (B) the steering wheels of said towing vehicle also being connected to a sensor to sense the position of the vehicle wheels as they are being steered;
    (C) said trailer wheels sensor being displayed to an operator of said vehicle so that the relative position of each of said steering wheels is known to the vehicle operator; and
    (D) the trailer wheels turning power source being connected to said vehicle so that an operator of said vehicle can remotely steer the wheels of said trailer.

2. The combination of claim 1, wherein said powered towing vehicle is a combine and said wheeled trailer is a grain trailer.

3. The combination of claim 1, which includes more than one of said wheeled trailers.

4. The combination of claim 1, wherein said source of power (a) and said source of power (b) are hydraulic power.

5. The combination of claim 1, wherein said sensor (c) is a radial sensor that measures the amount of rotation of said wheeled trailed about its connection point to said powered towing vehicle.

6. The combination of claim 1, wherein said powered towing vehicle is fitted with a controller that receives information from said sensor (A)(c) and said sensor (B), which controller controls the steering of said wheeled trailer in an automatic mode, a manual mode, and a straight mode.

7. The combination of claim 1, wherein said towing vehicle and said wheeled trailer are integrally formed into an articulated vehicle having a forward bogie having at least one axle assembly which is steerable and powered, and a rearward concatenated bogie having one axle assembly which is powered and steerable.

8. The combination of claim 1, wherein said powered towing vehicle has at least two axle assemblies, one of which is powered and the other of which is steerable.

9. The combination of claim 2, wherein said combine and said grain trailer are integrally formed into an articulated combine assembly having forward bogie having at least one axle assembly which is steerable and powered, and a rearward concatenated bogie having one axle assembly which is powered and steerable.

10. The combination of claim 9, wherein only said rearward bogie carries a hopper for storage of grain harvested by said combine.

11. The combination of claim 9, wherein said forward bogie has at least two axle assemblies, one of which is powered and the other of which is steerable.

12. The combination of claim 9, wherein said rearward bogie is fitted with a chaff distributor/fan mechanism.

13. Method for controlling a wheeled trailer of a combination of a powered towing vehicle having steering wheels and a wheeled trailer connected to said vehicle for its towing, which comprises:
    (a) connection the wheels of the trailer to a source of power for generating forward and rearward movement of the trailer;
    (b) connecting the wheels of the trailer to a source of power for turning such wheels in order to steer said trailer;
    (c) connecting the wheels of the trailer to a sensor to sense the position of the trailer wheels as they are being steered;
    (d) connecting the steering wheels of said towing vehicle to a sensor to sense the position of the vehicle wheels as they are being steered;
    (e) displaying an output from said trailer wheels sensor to an operator of said vehicle so that the relative position of each of said steering wheels is known to the vehicle operator; and
    (f) connecting the trailer wheels turning power source to said vehicle so that an operator of said vehicle can remotely steer the wheels of said trailer.

14. The method of claim 13, wherein said powered towing vehicle is a combine having an on-board primary grain storage hopper and said wheeled trailer is a grain trailer having a secondary grain hopper.

15. The method of claim 13, wherein said source of power (a) and said source of power (b) are hydraulic power.

16. The method of claim 13, which further includes the step of:
    (g) fitting said powered towing vehicle with a controller that receives the displayed outputs in step (e), wherein controller controls the steering of said wheeled trailer in an automatic mode, a manual mode, and a straight mode.

17. The method of claim 14, wherein said wheeled trailer can be displaced laterally from the longitudinal centerline of the powered towing vehicle while the combined is harvesting a field so that grain stored in the primary hopper can be transferred to the wheeled trailer secondary hopper.

18. The method of claim 14, wherein said wheeled trailer can be displaced laterally from the longitudinal centerline of the powered towing vehicle so that both the primary hopper and the secondary hopper can be unloaded simultaneously into a roadway hauling vehicle.

19. The method of claim 13, wherein said towing vehicle and said wheeled trailer are integrally formed into an articulated vehicle having a forward bogie having at least one axle assembly which is steerable and powered, and a rearward concatenated bogie having one axle assembly which is powered and steerable.

20. The method of claim 19, wherein said forward bogie has at least two axle assemblies, one of which is powered and the other of which is steerable.

21. The method of claim 14, wherein said combine and said grain trailer are integrally formed into an articulated combine assembly having forward bogie having at least one axle assembly which is steerable and powered, and a rearward concatenated bogie having one axle assembly which is powered and steerable.

22. The method of claim 21, wherein only said rearward bogie carries a hopper for storage of grain harvested by said combine.

23. The method of claim 21, wherein said forward bogie has at least two axle assemblies, one of which is powered and the other of which is steerable.

24. The method of claim 21, wherein said rearword bogie is fitted with a chaff distributor/fan mechanism.

* * * * *